(12) United States Patent
Nagampalli et al.

(10) Patent No.: US 7,966,643 B2
(45) Date of Patent: Jun. 21, 2011

(54) METHOD AND SYSTEM FOR SECURING A REMOTE FILE SYSTEM

(75) Inventors: Narasimha Rao Nagampalli, Kirkland, WA (US); Sachin C. Sheth, Bothell, WA (US); Shirish Koti, Redmond, WA (US); Yun Lin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 11/039,654

(22) Filed: Jan. 19, 2005

(65) Prior Publication Data

US 2006/0161966 A1  Jul. 20, 2006

(51) Int. Cl.
*G06F 17/00* (2006.01)
*H04L 29/06* (2006.01)

(52) U.S. Cl. .......................................... 726/1; 709/217
(58) Field of Classification Search ................. 726/1
See application file for complete search history.

(56) References Cited

U.S. PATENT DOCUMENTS

| | | |
|---|---|---|
| 5,361,359 A | 11/1994 | Tajalli et al. |
| 5,915,085 A | 6/1999 | Koved |
| 6,131,163 A | 10/2000 | Wiegel |
| 6,182,141 B1 | 1/2001 | Blum et al. |
| 6,405,212 B1 | 6/2002 | Samu et al. |
| 6,484,261 B1 | 11/2002 | Wiegel |
| 7,058,696 B1 * | 6/2006 | Phillips et al. ................ 709/217 |
| 7,167,926 B1 | 1/2007 | Boucher et al. |
| 7,480,655 B2 * | 1/2009 | Thomas et al. ........................ 1/1 |
| 7,536,542 B2 | 5/2009 | Sheth et al. |
| 2001/0023460 A1 | 9/2001 | Boucher et al. |
| 2002/0123966 A1 | 9/2002 | Chu et al. |
| 2002/0162005 A1 * | 10/2002 | Ueda et al. .................... 713/182 |
| 2003/0089675 A1 | 5/2003 | Koestler |
| 2003/0120811 A1 | 6/2003 | Hanson et al. |
| 2003/0177129 A1 | 9/2003 | Bond et al. |
| 2003/0233544 A1 | 12/2003 | Erlingsson |
| 2004/0030745 A1 | 2/2004 | Boucher et al. |
| 2004/0064578 A1 | 4/2004 | Boucher et al. |
| 2004/0078480 A1 | 4/2004 | Boucher et al. |
| 2004/0123188 A1 | 6/2004 | Srinivasan et al. |
| 2004/0158640 A1 | 8/2004 | Philbrick et al. |
| 2005/0166040 A1 | 7/2005 | Walmsley |
| 2005/0204058 A1 | 9/2005 | Philbrick et al. |
| 2005/0240591 A1 * | 10/2005 | Marceau et al. .................. 707/9 |
| 2006/0005227 A1 | 1/2006 | Samuelsson et al. |

(Continued)

OTHER PUBLICATIONS

TDI Requests Versus Events, Network Devices and Protocols: Windows DDK, Copyright Microsoft Corporation 2004, Built on Nov. 23, 2004, accessed Dec. 18, 2004 (1 page) http://msdn.microsoft.com/library/en-us/network/hh/network/303tdi_bcf6a688-0694-4767-ab3f-7a0ee1.

(Continued)

*Primary Examiner* — Kambiz Zand
*Assistant Examiner* — Dant B Shaifer Harriman
(74) *Attorney, Agent, or Firm* — Perkins Coie LLP

(57) ABSTRACT

A method and system for controlling access to files in a remote file system is provided. In one embodiment, a firewall system at a client computer system intercepts requests originating from the client computer system and sent to the remote file system for accessing remote files, that is, files stored on a server computer system. Upon intercepting a remote file access request (e.g., to open a remote file), the firewall system determines whether the file access request should be allowed based on access control criteria.

21 Claims, 5 Drawing Sheets

U.S. PATENT DOCUMENTS

| | | |
|---|---|---|
| 2006/0161981 A1 | 7/2006 | Sheth et al. |
| 2007/0079007 A1 | 4/2007 | Sethi et al. |
| 2007/0226788 A1 | 9/2007 | Lee |
| 2008/0046714 A1 | 2/2008 | Suganthi et al. |

OTHER PUBLICATIONS

TDI Kernel-Mode Client Interactions, Network Devices and Protocols: Windows DDK, Copyright Microsoft Corporation, 2004, Built on Nov. 23, 2004, Accessed Dec. 18, 2004 (2 pages) http://msdn.microsoft.com/library/en-us/network/hh/network/303tdi_2288ad17-a27b-4c0f-9832-7d41e6.

TDI Transports and Their Clients, Network Devices and Protocols: Windows DDK, Copyright 2004 Microsoft Corporation, accessed Dec. 18, 2004 (1 page) http://msdn.microsoft.com/library/en-us/netowrk/hh/network/303tdi-ffb2fd6d-d03a-4dec-95af-fb9116e1.

TDI File Objects, Network Devices and Protocols: Windows DDK, Copyright 2004 Microsoft Corporation, Accessed Dec. 18, 2004 (1 page) http://msdn.microsoft.com/library/en-us/network/hh/network/303tdi_c465flee-4a08-4350-9973-e5f325b.

Transport Driver Interface, Network Devices and Protocols: Windows DDK, Copyright Microsoft Corporation 2004, Built on Nov. 23, 2004, Accessed Dec. 18, 2004 (2 pages) http://msdn.microsoft.com/library/en-us/network/hh/network/303tdi_af260005-f147-404f-8883-d4b6328.

TDI Transports and Their Clients, Network Devices and Protocols: Windows DDK, Copyright 2004 Microsoft Corporation, Built on Sep. 2, 2004, accessed Oct. 29, 2004 (1 page) http://msdn.microsoft.com/library/en-us/network/hh/network/303tdi-ffb2fd6d-d03a-4dec-95af-fb9116e1.

TDI Transport Driver Routines, Network Devices and Protocols: Windows DDK, Copyright Microsoft Corporation 2004, accessed Dec. 18, 2004 (1 page) http://msdn.microsoft.com/library/en-us/network/hh/network/303tdi_e0lafe79-e6eb-452c-abbd-4d1f4a2.

TDI Device Objects, Network Devices and Protocols: Windows DDK, Built on Nov. 23, 2004 (2 pages) Accessed Dec. 18, 2004 http://msdn.microsoft.com/library/en-us/network/hh/network/303tdi_bccb5f94-c589-4d2b-8579-1a0436.

Varma, Eve L. et al., "Architecting the Services Optical Network," IEEE Communications Magazine, Sep. 2001, © 2001 IEEE, pp. 80-87.

McObject's eXtremeDB: First In-Memory Database for BlueCat Linux 5.0 and Linux 2.6 Kernel, Jun. 21, 2004.

Engler, D.R. et al., "Exokernel: An Operating System Architecture for Application-Level Resource Management," Dec. 1995, M.I.T. Laboratory, pp. 251-266.

Bellovin, Steven M., "Sub-Operating Systems: A New Approach to Application Security," 2002, ACM—New York, pp. 108-115.

* cited by examiner

METHOD AND SYSTEM FOR SECURING A REMOTE FILE SYSTEM

TECHNICAL FIELD

The described technology relates to security systems that generally prevent an application program from performing an undesirable behavior such as performing an unauthorized access of a file.

BACKGROUND

Although the Internet has had great successes in facilitating communications between computer systems and enabling electronic commerce, the computer systems connected to the Internet have been under almost constant attack by hackers seeking to disrupt their operation. Although many different types of attacks have been used, one of the most common types of attacks involves loading onto a computer system a file that contains instructions for performing a malicious behavior. For example, an executable file with a malicious behavior may be sent via an electronic mail message to the computer system. When a user executes that file, the malicious behavior is performed, such as randomly deleting files accessible via the computer system. The malicious behavior of files can vary significantly, with a self-replicating behavior of viruses, worms, and Trojan horses being the most pernicious. Many techniques have been developed to help identify whether the files that are being loaded onto or that are already loaded onto the computer system have a malicious behavior. These techniques are referred to generically as antivirus techniques.

One of the most common ways for the files to get loaded onto a particular computer system is by accessing files via a remote file system. A remote file system allows applications running on a computer system to access files that are stored on another computer system in a manner that is transparent to the applications. The computer system that accesses the file is referred to as a "client computer system," and the computer system that stores the file is referred to as a "server computer system." A server computer system can be dedicated to storing and serving of files. Alternatively, a server computer system can store and serve files and can access files stored on another computer system. In such a case, the computer system functions as both a server and client computer system. The computer systems that use a remote file system may also be peer computer systems that each function as a client and server computer system.

Whenever a client computer system downloads a file from a server computer system, there is a chance that the file may have a malicious behavior. Thus, whenever a file is downloaded from a server computer system to the client computer system, the client computer system may execute antivirus software to ensure that the file does not contain malicious behavior. If it does, then the antivirus software would discard the file so that the malicious behavior cannot be performed. A difficulty with such antivirus software is that detecting that a file has a malicious behavior can be computationally expensive and may not be effective at detecting previously unknown malicious behavior.

In addition to wanting to block the download of files with malicious behaviors, an enterprise (e.g., a corporation) may want to prevent users (e.g., employee) of its computer system from downloading certain types of files generally even though they do not have a malicious behavior. For example, a corporation may not want its employees to download MP3 files because of concerns of copyright violations or reduced employee productivity. An enterprise may also want to prevent the download of any files from certain server computer systems. For example, certain server computer systems may be known to have unlicensed copies of files or may have files containing sexually explicit material.

It would be desirable to have a technique for monitoring file access requests of a client computer system to server computer system so that the requests can be allowed or denied based on the file content, the file name path, the requested operation, and so on.

SUMMARY

A method and system for controlling access to files in a remote file system is provided. In one embodiment, a firewall system at a client computer system intercepts requests originating from the client computer system and sent to the remote file system for accessing remote files, that is, files stored on a server computer system. Upon intercepting a remote file access request (e.g., to open a remote file), the firewall system determines whether the file access request should be allowed based on access control criteria. The access control criteria may implement a security policy that is expressed in security rules. The firewall system may also be used to control access to files for other reasons than to prevent an attack.

DETAILED DESCRIPTION

Figure 1:
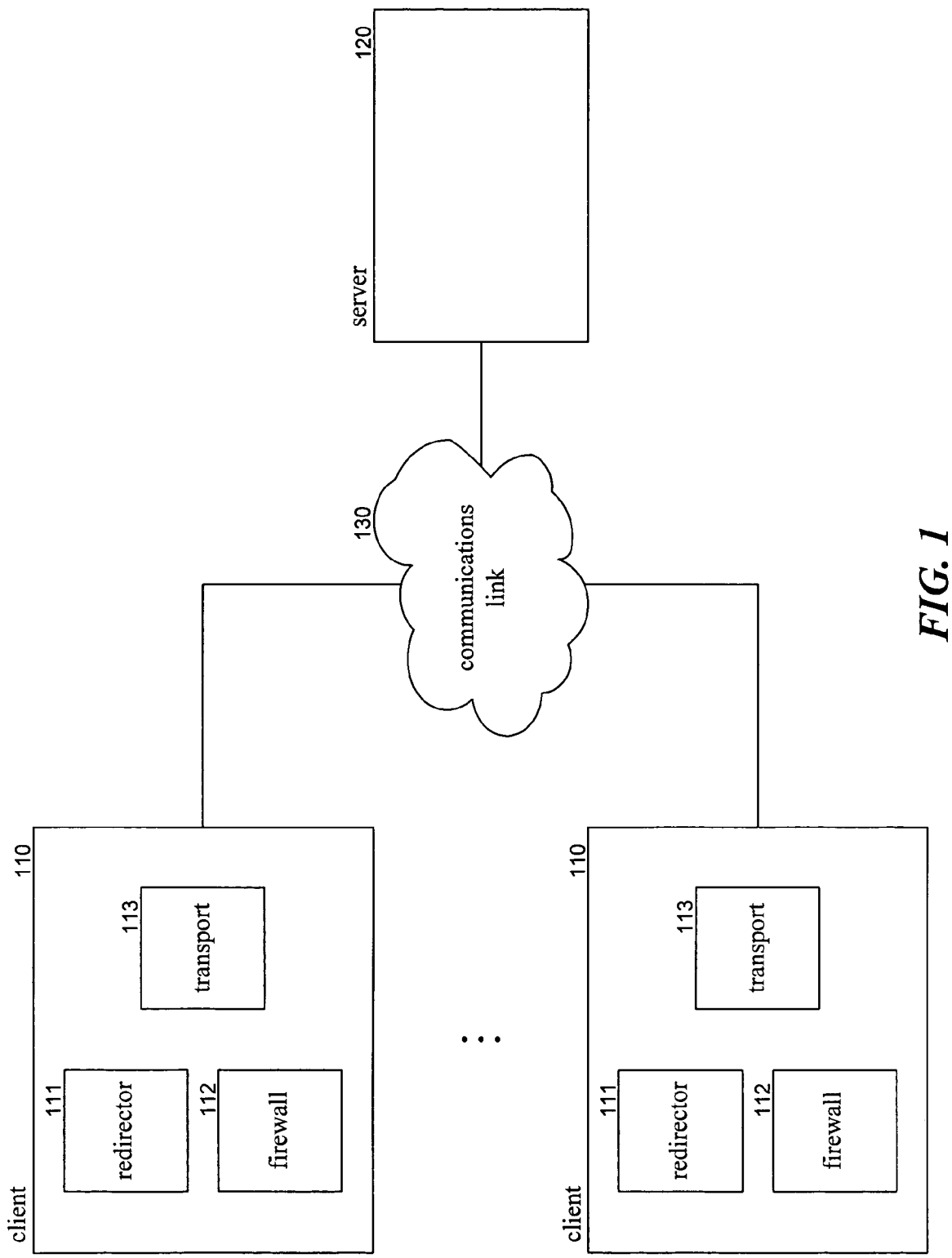
FIG. 1 is a block diagram that illustrates the relationship of the firewall system with a remote file system in one embodiment.

A method and system for controlling access to files in a remote file system is provided. In one embodiment, a firewall system at a client computer system intercepts requests originating from the client computer system and sent to the remote file system for accessing remote files, that is, files stored on a server computer system. Upon intercepting a remote file access request (e.g., to open a remote file), the firewall system determines whether the file access request should be allowed based on access control criteria. For example, the access control criteria may indicate that the request to open an executable file should not be allowed. If the access is allowed, then the firewall system lets the request pass to the remote file system so that the access can proceed. If not, then the firewall system does not forward the remote file access request to the remote file system, which effectively blocks or denies the access. The access control criteria may implement a security policy that is expressed in security rules. For example, it may be the policy of an enterprise not to allow computer systems of the enterprise to download executable files from server computer systems outside the enterprise. The firewall system may also be used to control access to files for other reasons than to prevent an attack. For example, the enterprise because of copyright concerns may want to prevent the downloading of MP3 files onto the computer systems of the enterprise. In such a case, an administrator of the enterprise may define a security rule to prevent the downloading of MP3 files. The administrator may also distribute the security policy of the enterprise to all or selected computer systems within the enterprise so that the security policy can be enforced at the computer systems. In this way, the firewall system executing on a computer system can be used to limit access to files via a remote file system in accordance with the security policy of an enterprise.

In one embodiment, a security policy includes rules that specify conditions, actions, and optionally exceptions. For example, a rule may indicate to block any attempt by a computer system to download an MP3 file. The condition of the rule may be satisfied when a remote file access request requests to open an MP3 file, and the action may be to fail the request without forwarding it to the remote file system so that the access cannot proceed. As another example, a rule may indicate to check the content of any file that is received from certain server computer systems. The checking of the content may be performed by antivirus software to ensure that files with malicious behavior are not downloaded from server computer systems that may not be trustworthy. Languages for specifying security policies are described in U.S. patent application Ser. No. 10/882,438, entitled "Languages for Expressing Security Policies" and filed on Jul. 1, 2004, which is hereby incorporated by reference.

The condition, action, and exception of the rules may be specified as expressions. A rule may be semantically expressed as "IF conditions THEN actions EXCEPT exceptions." Conditions of a rule are expressions of circumstances under which security enforcement actions of the rule are to be performed. An action is an expression of activity to be performed when the condition is satisfied. A rule may have multiple actions. An exception is an expression of when the actions may not be performed even though the condition is satisfied. A condition may be either static or dynamic. A static condition is one which refers, for example, to a hard-coded list of files. A dynamic condition is one which, for example, performs a query to determine a list of files matching a provided criterion. Security enforcement actions may include allowing a request that caused the security enforcement event, denying the request, soliciting input from a user, notifying the user, and so on. Other rule constructs are also possible. As an example, an "else" construct could be added to perform alternate actions when a condition is false.

In one embodiment, the firewall system may intercept remote file access requests by interfacing with a redirector of a remote file system. When an I/O manager executing at a client computer system receives a file access request (e.g., from an application or operating system), it determines whether the file is stored locally or remotely. If the file is stored locally, the local file system proceeds to access the file as requested. If, however, the file is stored remotely, the I/O manager forwards the request to a redirector. The redirector is responsible for sending the request to the server computer system that stores the file to be accessed. The filename may adhere to the Universal Naming Convention, and the network address may adhere to the Internet Protocol ("IP") address protocol. The redirector may use the services of the Domain Name System ("DNS") to identify the IP address of the server computer system. When the filename is resolved to the IP address of the server computer system, the redirector forwards the remote file access request to a transport mechanism for delivery to the identified IP address.

The firewall system may intercept the remote file access request at various points of processing by the redirector. For example, the firewall system may intercept the remote file access request before the redirector identifies the IP address. When the remote file access request is intercepted at this point, the firewall system may identify and apply rules that relate to the filename. For example, a rule to prevent the downloading of MP3 files may specify that its condition is satisfied when a remote file access request has a filename with an MP3-compatible extension. A rule may have as its condition various criteria form filename matching. As another example, the firewall system may intercept the remote file access requests after the redirector identifies the IP address. In such a case, the firewall system may identify and apply rules that relate to the IP address. As another example, the firewall system may intercept responses from server computer systems to remote file access requests and apply the appropriate rules. For example, one rule may indicate that antivirus software should be run to scan files based on various conditions such as the IP address of the server computer system, file extension type, and so on.

In one embodiment, the firewall system may maintain state information for each opened file. When a remote file access request is received to initially access a file (e.g., open or create), the firewall system creates a "flow" for that file, which is analogous in some respects to a file control block of a traditional file system. The flow is a data structure that contains information relating to access of the file. For example, the data structure may include the handle assigned by the remote file system, the filename, the IP address, and an indication of the rules that apply to the file. When the file is subsequently accessed, the firewall system may use the handle provided in the remote file access request to identify the corresponding flow. The firewall system can then apply the rules identified by the flow. In this way, the firewall system does not need to re-identify the rules with each subsequent access request. If the firewall system denies the initial access, then it might not create a flow and it fails the request with an access denied error. In that case, the requesting program of the denial will not receive a valid handle to the file. Without a valid handle, subsequent requests cannot be issued to the file. In some instances, the firewall system may not create a flow even though the initial remote file access request is allowed. For example, the firewall system may not create a flow when no rules apply and the requesting application is allowed unfettered access to the file. In such a case, when a subsequent request is received by the firewall system, it detects that no flow has been created and notifies the redirector that the request is allowed without applying any rules.

In one embodiment, a remote file access request may include an indication of a subsequent access to be requested. For example, a remote file access request that requests to open the file may include an indication that the requesting program will next request to write to that file. By knowing that a subsequent access request will request to write to a file, a rule can be developed that would deny the initial open request on the basis that the subsequent access request would be denied. This denial may be referred to as "opportunistic denial." Such an opportunistic denial prevents the overhead of opening a remote file when the intended access will be eventually denied.

In one embodiment, the firewall system may be used to implement general access control of the remote file system. For example, an enterprise may develop rules to specify which users can access which files and the type of access that is allowed. The access control can be based on the filename, username, file attributes, access type, and so on. The rule may implement a type of access control list associated with a file similar to that used by a traditional file system. The firewall system, however, can provide access control for nonexistent files. For example, a rule may be developed to prevent the creation of a file with a certain filename or an extension (e.g., identified by a filename criteria). Thus, a "virtual" access control list specifying access control rights can be associated with a file that has not been created.

FIG. 1 is a block diagram that illustrates the relationship of the firewall system with a remote file system in one embodiment. Client computer systems 110 are connected to server computer systems 120 via a communications link 130. The remote file system has components residing on the client computer systems and the server computer systems. A client computer system includes a redirector 111, a firewall component 112, and a transport component 113. The redirector may be a conventional component of a remote file system. Alternatively, the redirector may be adapted to allow remote file access requests to be intercepted. The transport component 113 may be a conventional transport component such as an Internet protocol transport. The firewall component implements the firewall system. The firewall component intercepts remote file access requests that are processed by the redirector, applies the rules of the security policy, and when the security policy indicates that the requests are allowed, forwards the requests to the transport component for forwarding to the server computer systems.

The computing device on which the firewall system is implemented may include a central processing unit, memory, input devices (e.g., keyboard and pointing devices), output devices (e.g., display devices), and storage devices (e.g., disk drives). The memory and storage devices are computer-readable media that may contain instructions that implement the firewall system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

The firewall system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The host computer systems may be cell phones, personal digital assistants, smart phones, personal computers, programmable consumer electronics, digital cameras, and so on.

The firewall system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
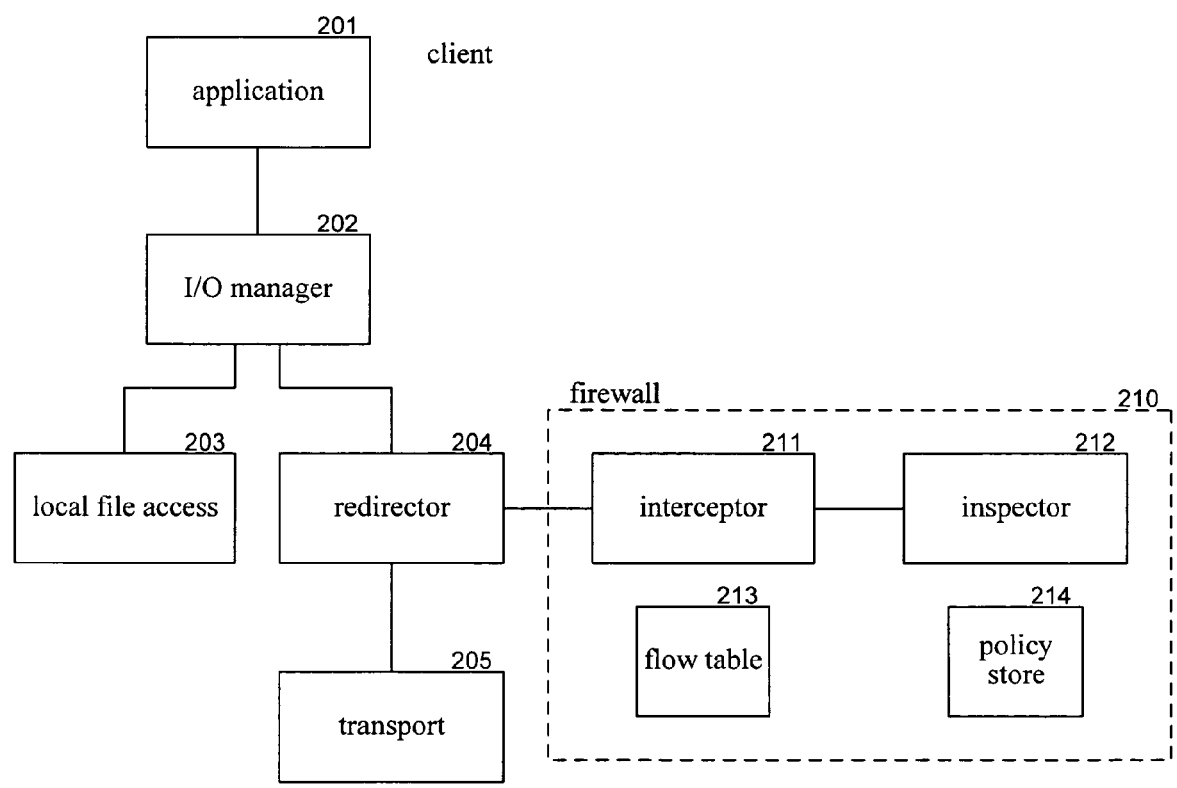
FIG. 2 is a block diagram that illustrates components of the firewall system and the relationship with a remote file system in one embodiment.

FIG. 2 is a block diagram that illustrates components of the firewall system and the relationship with a remote file system in one embodiment. An application program 201 or some other program submits a file access request to an I/O manager 202. The I/O manager determines whether the request is to access a local file or a remote file. If the request is to access a local file, then the file manager forwards the request to a local file access component 203. If the request is to access a remote file, then the file manager forwards the request to a redirector 204. As described above, the redirector maps the filename to the IP address and forwards the request via a transport component 205. A firewall component 210 includes an interceptor component 211, an inspector component 212, a flow table 213, and a policy store 214. The interceptor component intercepts remote file access requests that are processed by the redirector. The interceptor component passes the intercepted remote file access request to the inspector component. Techniques for intercepting communication are described in U.S. patent application Ser. No. 11/040,164, filed concurrently and entitled, "Method and System for Intercepting, Analyzing, and Modifying Interactions Between a Transport Client and a Transport Provider," now U.S. Pat. No. 7,536,542, which is hereby incorporated by reference. The inspector component invokes a rules engine to apply to the rules stored in the policy store. The inspector component also creates flows as appropriate and adds them to the flow table. The inspector component notifies the interceptor component whether the remote file access requests are allowed or denied. The interceptor component may notify the redirector that the request has been allowed or denied. If the request is allowed, then the redirector can continue processing the remote file access request, else the redirector notifies the file manager that the request has been denied.

Figure 3:
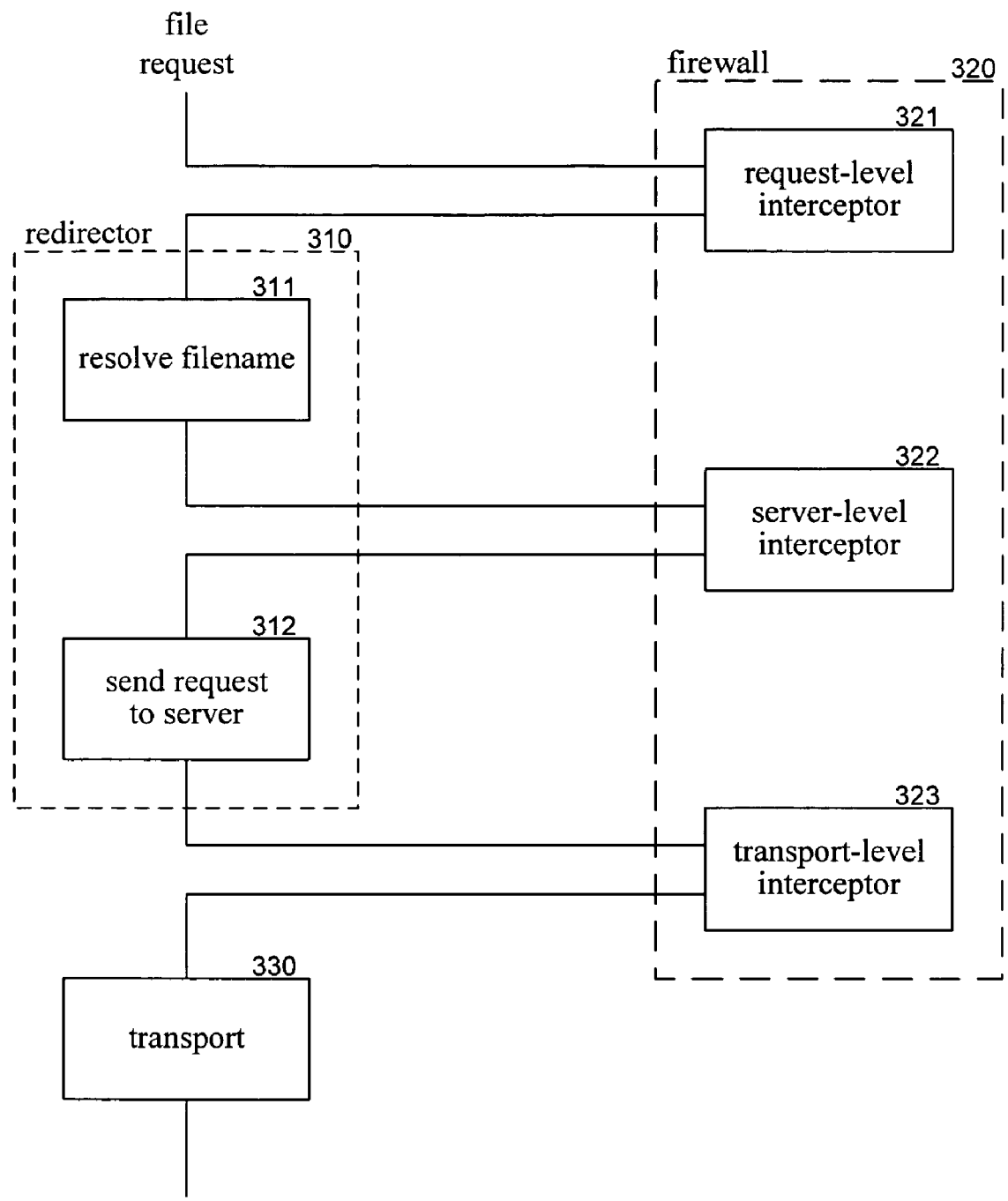
FIG. 3 is a block diagram that illustrates the interception of remote file access requests by the firewall system in one embodiment.

FIG. 3 is a block diagram that illustrates the interception of remote file access requests by the firewall system in one embodiment. A redirector 310 may include a resolve filename component 311 and a send request to server component 312. A firewall system 320 may include a request-level interceptor component 321, a server-level interceptor component 322, and a transport-level interceptor component 323. When a remote file access request is received by the redirector, it may be forwarded to the firewall system. Alternatively, the firewall system may initially intercept the remote file access request before it is sent to the redirector. The request-level interceptor component forwards the intercepted remote file access request to the inspector component (not shown) to determine whether the request should be allowed or denied. The resolve filename component resolves the filename associated with the received remote file access request to the IP address of the server computer system that stores the file. The server-level interceptor component then intercepts the remote file access request and invokes the inspector component (not shown) to allow or deny the request based on the IP address and other information of the request. The send request to server component forwards the allowed remote file access request, which is intercepted by the transport-level interceptor component. The transport-level interceptor component invokes the inspector component to determine whether to allow or deny the request based on the transport level information. A transport component 330 then forwards the allowed remote file access request to the resolve IP address.

Figure 4:
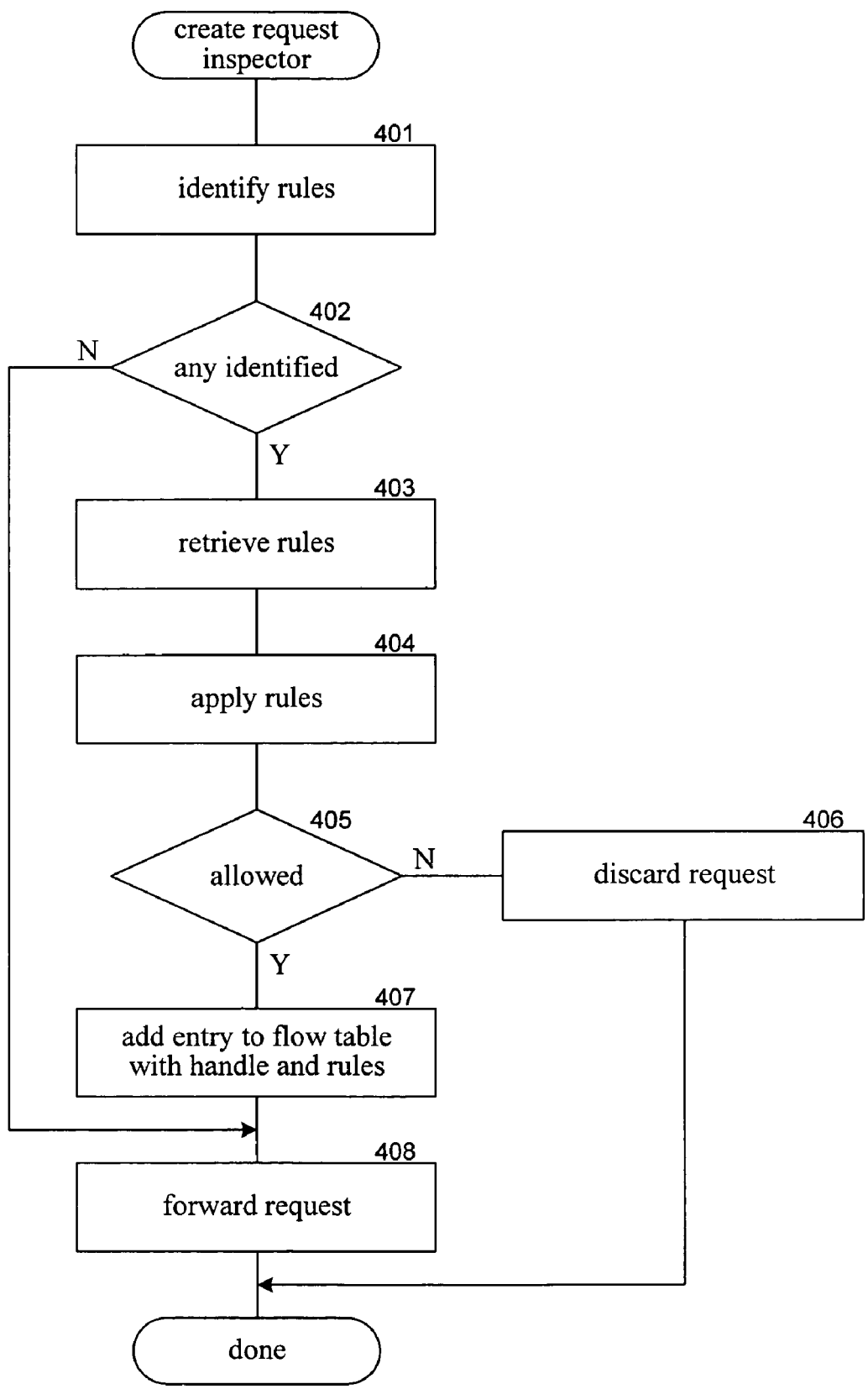
FIG. 4 is a flow diagram that illustrates the processing of a create request inspector component in one embodiment.

FIG. 4 is a flow diagram that illustrates the processing of a create request inspector component in one embodiment. The component is passed a remote file access request to open a file. The component is a sub-component of the inspector component and is responsible for inspecting requests to create a remote file. In block 401, the component identifies rules that apply to the remote file access request to create a file. In decision block 402, if any rules have been identified, then the component continues at block 403, else the component continues at block 408. In block 403, the component retrieves the identified rules. In block 404, the component applies the retrieved rules to the remote file access request. One skilled in the art will appreciate that the identifying, retrieving, and applying of rules may be performed by a rules engine. In decision block 405, if the remote file access request is allowed, then the component continues at block 407, else the component continues at block 406. In block 406, the component discards the remote file access request or in some other way indicates that the request has been denied and then completes. In block 407, the component adds a flow to the flow table that is indexed by the handle associated with the file. The flow may identify rules that are to be applied to subsequent requests to access the file. In block 408, the component forwards the request or in some other way indicates that the request is allowed. The component then completes.

Figure 5:
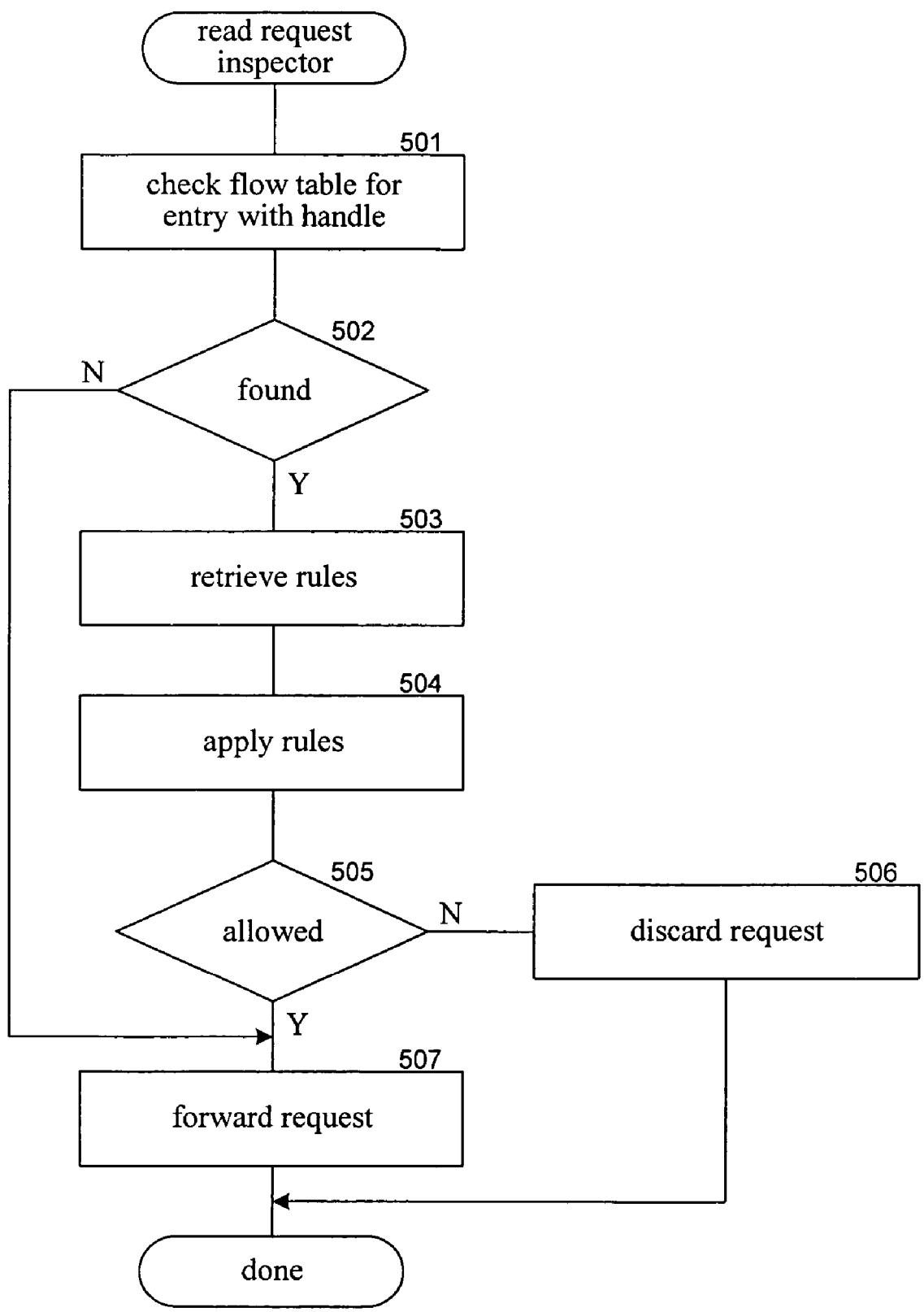
FIG. 5 is a flow diagram that illustrates the processing of a read request inspector component in one embodiment.

FIG. 5 is a flow diagram that illustrates the processing of a read request inspector component in one embodiment. The component is passed the remote file access request. In block 501, the component checks a flow table to determine whether it contains a flow corresponding to the handle of the remote file access request. In decision block 502, if a flow is found, then the component continues at block 503, else the component continues at block 507. In block 503, the component retrieves the rules identified by the flow. In block 504, the component applies the retrieved rules to the remote file access request. In decision block 505, if the request is allowed, then the component continues at block 507, else the component continues at block 506. In block 506, the component discards the remote file access request and then completes. In block 507, the component forwards the remote file access request and then completes.

From the foregoing, it will be appreciated that specific embodiments of the firewall system have been described herein for purposes of illustration, but that various modifications may be made without deviating from the spirit and scope of the invention. The firewall system may be implemented on a proxy server that implements a redirector of a remote file system. The proxy server may receive all remote file access requests generated by a client computer system of an enterprise and the firewall system may enforce the policy of the enterprise relating to access of remote files. Alternatively, each redirector of a client computer system may forward requests to a firewall system installed on another computer system for enforcing the policy. One skilled in the art will also appreciate that the firewall system may modify a remote file access request, rather than deny it, to allow access within limits. For example, the remote file access request may request to open a file with read/write capability and the firewall system may modify the request so that the file is opened only with read capability. Accordingly, the invention is not limited except as by the appended claims.

We claim:

1. A method, in a computer system having a memory and a processor, for enforcing within the computer system a policy for a remote file access request, wherein the computer system belongs to an enterprise having a plurality of associated computer systems, the method comprising:

receiving a plurality of security rules, each security rule specifying a file type, the plurality of security rules being defined by an administrator of the enterprise and being distributed to each of a plurality of computer systems within the enterprise so that the security rules can be enforced at each of the plurality of computer systems, the plurality of security rules composing a portion of a policy;

under control of a firewall executing on the computer system, receiving, from a first application executing on the computer system, a first remote file access request to open a first file of a remote file system having a first file type, wherein the first remote file access request originates at the computer system, with a processor, identifying first security rules of the received plurality of security rules that apply to the first remote file access request, wherein the identifying of the first security rules is performed without accessing any other computer system, applying the first security rules to determine whether the computer system should be denied from forwarding the first remote file access request to the remote file system, wherein the applying is performed without accessing any other computer system, when it is determined that the computer system should be denied from forwarding the first remote file access request to the remote file system, discarding the first remote file access request, when it is determined that the computer system should not be denied from forwarding the first remote file access request to the remote file system, forwarding the first remote file access request to the remote file system, creating a flow data structure for the first file of the remote file system, the flow data structure comprising an indication of a handle assigned by the remote file system to the first file of the remote file system, an indication of a filename associated with the first file of the remote file system, an indication of a network address associated with the first file of the remote file system, and an indication of security rules that are to be applied to subsequent requests to access the first file of the remote file system, adding an indication of the created flow data structure for the first file of the remote file system to a flow table on the computer system, receiving, from the first application executing on the computer system, a second remote file access request to access the first file of the remote file system, wherein the second remote file access request originates at the computer system and includes an indication of the handle assigned to the first file, with a processor, identifying, based at least in part on the handle included in the second remote file access and the flow table, second security rules of the received plurality of security rules that apply to the second remote file access request, wherein the identifying of the second security rules is performed without accessing any other computer system, applying, at the computer system where the second remote file access request originated, the identified second security rules to the second remote file access request to determine whether the computer system should be denied from forwarding the second remote file access request at least in part by determining whether any of the identified second security rules specify the first file type, and when it is determined that the computer system should be denied from forwarding the second remote file access, indicating at the computer system that forwarding the second remote file access request is denied without forwarding the second remote file access request to the remote file system so that the remote file system does not receive the second remote file access request and the second remote file access request cannot be allowed by the remote file system, receiving, from a second application executing on the computer system, a third remote file access request to open a second file of the remote file system having a second file type, wherein the third remote file access request originates at the computer system and includes an indication of a fourth remote file access request to access the second file of the remote file system, with a processor, identifying third security rules of the received plurality of security rules that apply to the fourth remote file access request, wherein the identifying of the third security rules is performed without accessing any other computer system, applying, at the computer system where the third remote file access request originated, the identified third security rules to the fourth remote file access request to determine whether the computer system should be denied from forwarding the fourth remote file access request, and when it is determined that the computer system should be denied from forwarding the fourth remote file access request, indicating at the computer system that the computer system is denied from forwarding the third remote file access request so that the third remote file access request is denied, and under control of the remote file system,
receiving from the firewall executing on the computer system the first remote file access request, and
processing the second remote file access request to determine whether to allow or deny the first remote file access request wherein after the computer system forwards remote file access requests to access a file of the remote file system, some of the forwarded remote file access requests are allowed by the remote file system and others are denied by the remote file system.

2. The method of claim 1 wherein the receiving of the remote file access request includes intercepting the remote file access request as it is processed by a redirector of a remote file system.

3. The method of claim 2 wherein the intercepting is performed at multiple points during processing of the remote file access request by the redirector.

4. The method of claim 1 wherein the enforcing of the policy is performed on the computer system that originates the request.

5. The method of claim 1 wherein a rule applies to files that have not been created.

6. The method of claim 1 wherein a rule applies to files whose name matches a name criterion.

7. The method of claim 1 wherein a rule prevents files that match a criterion from being downloaded to the computer system.

8. The method of claim 1 including applying rules to content of a file that is received in response to the remote file access request.

9. The method of claim 1 wherein the policy implements access control to remote files.

10. The method of claim 1 wherein the policy implements a virtual access control list.

11. The method of claim 1 wherein a remote file access request indicates the type of access to be subsequently performed.

12. The method of claim 11 wherein a rule indicates to block a remote file access request based on the type of access that is to be subsequently requested.

13. A method in a computer system, having a memory and a processor, for controlling access to files in a remote file system that is remote from the computer system, the method comprising:

intercepting at the computer system a first remote file access request, sent by a first application executing on the computer system, to create a first file, having a first file type, on the remote file system that is remote from the computer system, wherein the first remote file access request originates at the computer system;

with a processor, identifying first security rules that apply to the first remote file access request, wherein the identifying of the first security rules is performed without accessing any other computer system;

with a processor, determining at the computer system, without accessing any other computer system, based at least in part on the identified first security rules, whether the first remote file access request can be forwarded to the remote file system based on the first file type, irrespective of whether the remote file system would allow or deny the first remote file access request if forwarded;

when it is determined at the computer system that the first remote file access request should not be forwarded to the remote file system, discarding the first remote file access request;

when it is determined at the computer system that the first remote file access request can be forwarded to the remote file system,
  indicating that forwarding of the first remote file access request is allowed to allow the first remote file access request to be forwarded to the remote file system so that the remote file system can determine whether to allow or deny the first remote file access request,
  forwarding the first remote file access request to the remote file system,
  creating a flow data structure for the first file on the remote file system, the flow data structure comprising a handle assigned by the remote file system to the first file on the remote file system, a filename associated with the first file on the remote file system, a network address associated with the first file on the remote file system, and an indication of security rules that are to be applied to subsequent requests to access the first file on the remote file system,
  adding an indication of the created flow data structure for the first file on the remote file system to a flow table on the computer system,
  intercepting at the computer system a second remote file access request, sent by the first application executing on the computer system, to access the first file on the remote file system, wherein the second remote file access request originates at the computer system and includes an indication of the handle assigned to the first file,
  identifying, based at least in part on the handle included in the second remote file access and the flow table, second security rules that apply to the second remote file access request, wherein the identifying of the second security rules is performed without accessing any other computer system,
  determining at the computer system, without accessing any other computer system, based at least in part on the identified second security rules, whether the second remote file access request can be forwarded to the remote file system at least in part by determining whether any of the identified second security rules specify the first file type, and when it is determined at the computer system that the second remote file access request should not be forwarded to the remote file system, indicating at the computer system that forwarding the second remote file access request is denied without forwarding the second remote file access request to the remote file system so that the remote file system does not receive the second remote file access request and the second remote file access request cannot be allowed by the remote file system;

intercepting at the computer system a third remote file access request, sent by a second application executing on the computer system, to open a second file on the remote file system having a second file type, wherein the third remote file access request originates at the computer system and includes an indication of a fourth remote file access request to access the second file on the remote file system;

with a processor, identifying third security rules that apply to the fourth remote file access request, wherein the identifying of the third security rules is performed without accessing any other computer system;

determining at the computer system where the third remote file access request originated, based at least in part on the identified third security rules, whether the fourth remote file access request can be forwarded to the remote file system;

when it is determined at the computer system that the fourth remote file access request should not be forwarded to the remote file system, indicating at the computer system that the computer system is denied from forwarding the third remote file access request so that the third remote file access request is not allowed;

wherein the remote file system is configured to,
 receive remote file access requests from the computer system, and
 process each received remote file access requests to determine whether to allow or deny the received remote file access request; and wherein when it is determined at the computer system that a particular remote file access request cannot be forwarded to the remote file system, modifying the particular remote file access request.

14. The method of claim 13 wherein the receiving of the first remote file access request includes intercepting the first remote file access request as it is processed by a redirector.

15. The method of claim 13 wherein at least one security rule applies to a nonexistent file.

16. The method of claim 13, further comprising:
forwarding the modified particular remote file access request.

17. A computer-readable storage medium containing instructions that, when executed by a client computer system having a memory and a processor, perform operations for enforcing a security policy at the client computer system, the operations comprising:

intercepting at the client computer system a first remote file access request, sent by a first application executing on the client computer system, to create a first file, having a first file type, on the remote file system that is remote from the client computer system, wherein the first remote file access request originates at the client computer system;

identifying first security rules that apply to the first remote file access request, wherein the identifying of the first security rules is performed without accessing any other computer system;

determining at the client computer system, without accessing any other computer system, based at least in part on the identified first security rules, whether the first remote file access request can be forwarded to the remote file system based on the first file type, irrespective of whether the remote file system would allow or deny the first remote file access request if forwarded:

when it is determined at the client computer system that the first remote file access request should not be forwarded to the remote file system, discarding the first remote file access request;

when it is determined at the client computer system that the first remote file access request can be forwarded to the remote file system,
 indicating that forwarding of the first remote file access request is allowed to allow the first remote file access request to be forwarded to the remote file system so that the remote file system can determine whether to allow or deny the first remote file access request,
 forwarding the first remote file access request to the remote file system,
 creating a flow data structure for the first file on the remote file system, the flow data structure comprising a handle assigned by the remote file system to the first file on the remote file system, a filename associated with the first file on the remote file system, a network address associated with the first file on the remote file system, and an indication of security rules that are to be applied to subsequent requests to access the first file on the remote file system,
 adding an indication of the created flow data structure for the first file on the remote file system to a flow table on the client computer system,
 intercepting at the client computer system a second remote file access request, sent by the first application executing on the client computer system, to access the first file on the remote file system, wherein the second remote file access request originates at the client computer system and includes an indication of the handle assigned to the first file,
 identifying, based at least in part on the handle included in the second remote file access and the flow table, second security rules that apply to the second remote file access request, wherein the identifying of the second security rules is performed without accessing any other computer system,
 determining at the client computer system, without accessing any other computer system, based at least in part on the identified second security rules, whether the second remote file access request can be forwarded to the remote file system at least in part by determining whether any of the identified second security rules specify the first file type, and
 when it is determined at the client computer system that the second remote file access request should not be forwarded to the remote file system, indicating at the client computer system that forwarding the second remote file access request is denied without forwarding the second remote file access request to the remote file system so that the remote file system does not receive the second remote file access request and the second remote file access request cannot be allowed by the remote file system;

intercepting at the client computer system a third remote file access request originated at the client computer system and sent by a second application executing at the client computer system, to open a second file stored on the remote file system that is remote from the client computer system and including an indication of a fourth remote file access request;

identifying third security rules that apply to the fourth remote file access request, wherein the identifying of the third security rules is performed without accessing any other computer system;

determining at the client computer system, without accessing any other computer system, based at least in part on the identified third security rules, whether the fourth remote file access request should be denied from being forwarded to the remote file system, the third security rules composing a portion of a security policy;

when it is determined that the fourth remote file access request should be denied from being forwarded to the remote file system, suppressing the forwarding of the third remote file access request to the remote file system so that the third remote file access request cannot be allowed by the remote file system; and when it is determined that the fourth remote file access should not be denied from being forwarded to the remote file system,
- forwarding the third remote file access request to the remote file system so that the remote file system can determine whether to allow or deny the third remote file access request, and
- forwarding the fourth remote file access request to the remote file system so that the remote file system can determine whether to allow or deny the fourth remote file access request.

18. The computer-readable storage medium of claim 17 wherein the client computer system and the server computer system implement a remote file system.

19. The computer-readable storage medium of claim 17 including determining whether content of a file that is received in response to the first remote file access request complies with the security policy.

20. A computing system, having a memory and a processor, comprising:
- a component configured to receive a plurality of security rules, each security rule specifying a file type, the plurality of security rules being defined by an administrator of the enterprise and being distributed to each of a plurality of computing systems within the enterprise so that the security rules can be enforced at each of the plurality of computing systems, the plurality of security rules composing a portion of a security policy; and
- a component configured to, under control of a firewall executing on the computing system,
  - receive, from a first application executing on the computing system, a first remote file access request to open a first file of a remote file system having a first file type, wherein the first remote file access request originates at the computing system,
  - identify first security rules of the received plurality of security rules that apply to the first remote file access request without accessing any other computing system,
  - apply the first security rules to determine whether the computing system should be denied from forwarding the first remote file access request to the remote file system without accessing any other computing system,
  - when it is determined that the computing system should be denied from forwarding the first remote file access request to the remote file system, discard the first remote file access request,
  - when it is determined that the computing system should not be denied from forwarding the first remote file access request to the remote file system,
    - forward the first remote file access request to the remote file system,
    - create a flow data structure for the first file of the remote file system, the flow data structure comprising an indication of a handle assigned by the remote file system to the first file of the remote file system, an indication of a filename associated with the first file of the remote file system, an indication of a network address associated with the first file of the remote file system, and an indication of security rules that are to be applied to subsequent requests to access the first file of the remote file system,
    - add an indication of the created flow data structure for the first file of the remote file system to a flow table on the computing system,
    - receive from the first application executing on the computing system, a second remote file access request to access the first file of the remote file system, wherein the second remote file access request originates at the computing system and includes an indication of the handle assigned to the first file by the remote file system,
    - identify, based at least in part on the handle included in the second remote file access and the flow table, second security rules of the received plurality of security rules that apply to the second remote file access request without accessing any other computing system,
    - apply, at the computing system where the second remote file access request originated, the identified second security rules to the second remote file access request to determine whether the computing system should be denied from forwarding the second remote file access request at least in part by determining whether any of the identified second security rules specify the first file type, and
    - when it is determined that the computing system should be denied from forwarding the second remote file access, indicate at the computing system that forwarding the second remote file access request is denied without forwarding the second remote file access request to the remote file system so that the remote file system does not receive the second remote file access request and the second remote file access request cannot be allowed by the remote file system,
  - receive, from a second application executing on the computing system, a third remote file access request to open a second file of the remote file system having a second file type, wherein the third remote file access request originates at the computing system and includes an indication of a fourth remote file access request to access the second file of the remote file system,
  - identify third security rules of the received plurality of security rules that apply to the fourth remote file access request without accessing any other computing system,
  - apply, at the computing system where the third remote file access request originated, the identified third security rules to the fourth remote file access request to determine whether the computing system should be denied from forwarding the fourth remote file access request, and when it is determined that the computing system should be denied from forwarding the fourth remote file access request, indicate at the computing system that the computing system is denied from forwarding the third remote file access request so that the third remote file access request is denied; and a component configured to, under control of the remote file system,
- receive from the firewall executing on the computer system the first remote file access request, and
- process the second remote file access request to determine whether to allow or deny the first remote file access request wherein after the computing system forwards remote file access requests to access a file of the remote file system, some of the forwarded remote file access requests are allowed by the remote file system and others are denied by the remote file system, and wherein at least one of the components comprises computer-executable instructions stored in memory for execution by the computing system.

21. The computing system of claim 20, further comprising:
a component configured to determine whether content of the first file complies with the security policy.

* * * * *

UNITED STATES PATENT AND TRADEMARK OFFICE
CERTIFICATE OF CORRECTION

| | | |
|---|---|---|
| PATENT NO. | : 7,966,643 B2 | Page 1 of 1 |
| APPLICATION NO. | : 11/039654 | |
| DATED | : June 21, 2011 | |
| INVENTOR(S) | : Narasimha Rao Nagampalli et al. | |

It is certified that error appears in the above-identified patent and that said Letters Patent is hereby corrected as shown below:

In column 11, line 35, in Claim 13, after "receive" delete "remote file access requests".

In column 11, line 35, in Claim 13, after "from" insert -- a firewall executing on --.

In column 11, line 36, in Claim 13, after "system" insert -- the first remote file access request --.

In column 11, line 37, in Claim 13, delete "each received" and insert -- the second --, therefor.

In column 11, line 37, in Claim 13, delete "requests" and insert -- request --, therefor.

In column 11, line 38, in Claim 13, delete "received" and insert -- first --, therefor.

In column 12, line 53, in Claim 17, after "file type," delete "and".

In column 12, line 63, in Claim 17, after "system" insert -- , and under control of the remote file system, receiving, from a firewall executing on the computer system, the first remote file access request, and processing the second remote file access request to determine whether to allow or deny the first remote file access request --.

Signed and Sealed this
Sixteenth Day of August, 2011

David J. Kappos
*Director of the United States Patent and Trademark Office*